United States Patent
Yang et al.

(10) Patent No.: US 11,921,072 B2
(45) Date of Patent: Mar. 5, 2024

(54) CONTACT-TYPE DETECTION ELECTRODE AND MOVABLE ELECTRIC DEVICE

(71) Applicants: GUANGDONG MIDEA WHITE HOME APPLIANCE TECHNOLOGY INNOVATION CENTER CO., LTD., Foshan (CN); MIDEA GROUP CO., LTD., Foshan (CN)

(72) Inventors: Pin Yang, Foshan (CN); Guilin Xiong, Foshan (CN); Xinjian Huang, Foshan (CN); Shuyun Wu, Foshan (CN); Jiefeng Cheng, Foshan (CN)

(73) Assignees: GUANGDONG MIDEA WHITE HOME APPLIANCE TECHNOLOGY INNOVATION CENTER CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 439 days.

(21) Appl. No.: 17/290,243

(22) PCT Filed: Dec. 21, 2018

(86) PCT No.: PCT/CN2018/122652
§ 371 (c)(1),
(2) Date: Apr. 29, 2021

(87) PCT Pub. No.: WO2020/093554
PCT Pub. Date: May 14, 2020

(65) Prior Publication Data
US 2022/0018794 A1    Jan. 20, 2022

(30) Foreign Application Priority Data
Nov. 9, 2018  (CN) .......................... 201811338412.0

(51) Int. Cl.
*G01N 27/02*    (2006.01)
*A47L 11/24*    (2006.01)
*A47L 11/40*    (2006.01)

(52) U.S. Cl.
CPC .............. *G01N 27/02* (2013.01); *A47L 11/24* (2013.01); *A47L 11/4002* (2013.01); *A47L 11/4011* (2013.01); *A47L 2201/06* (2013.01)

(58) Field of Classification Search
CPC ...... G01N 27/02; G01N 27/04; G01N 27/226; A47L 11/24; A47L 11/4002;
(Continued)

(56) References Cited

U.S. PATENT DOCUMENTS 5,608,944 A * 3/1997 Gordon ................. A47L 9/2857
15/319
8,080,803 B2 * 12/2011 Freund .................... G01T 1/243
378/19
(Continued)

FOREIGN PATENT DOCUMENTS

CN    102106713 A    6/2011
CN    105628742 A    6/2016
(Continued)

OTHER PUBLICATIONS

International search report, PCT/CN2018/122652, dated Apr. 30, 2019(13 pages).
(Continued)

*Primary Examiner* — Giovanni Astacio-Oquendo

(57) ABSTRACT

A contact-type detection electrode for detecting dispersible dirt and a movable electric device are provided. The contact-type detection electrode includes a support, and electrical conductors arranged on the support and being flexible.

15 Claims, 3 Drawing Sheets

(58) Field of Classification Search
CPC ............ A47L 11/4011; A47L 2201/06; A47L 11/4077; A47L 2201/00; A47L 11/40; A47L 9/2805; A47L 9/2852; A47L 2201/04
USPC .......................................... 324/650, 649, 600
See application file for complete search history.

(56) References Cited

U.S. PATENT DOCUMENTS

| | | | | |
|---|---|---|---|---|
| 9,134,211 | B2* | 9/2015 | Cho | .................. G01B 7/18 |
| 9,663,201 | B2* | 5/2017 | Sim | .................. B08B 7/04 |
| 11,122,951 | B2* | 9/2021 | Gschrey | .............. A47L 9/1409 |
| 2015/0107449 | A1 | 4/2015 | Son | |
| 2017/0049288 | A1* | 2/2017 | Knutson | ............ A47L 11/4083 |
| 2017/0332872 | A1 | 11/2017 | Jun et al. | |
| 2021/0389772 | A1* | 12/2021 | Kim | ................... A47L 11/4002 |
| 2021/0393100 | A1* | 12/2021 | Yang | ................... A47L 11/4041 |

FOREIGN PATENT DOCUMENTS

| | | |
|---|---|---|
| CN | 106333631 A | 1/2017 |
| CN | 106524886 A | 3/2017 |
| CN | 206388311 U | 8/2017 |
| CN | 206403711 U | 8/2017 |
| CN | 107530214 A | 1/2018 |
| CN | 107913034 A | 4/2018 |
| CN | 207400702 U | 5/2018 |
| CN | 108286934 A | 7/2018 |
| CN | 207881914 U | 9/2018 |
| CN | 108742333 A | 11/2018 |
| EP | 3858210 A1 | 8/2021 |
| EP | 3858211 A1 | 8/2021 |
| JP | H0330745 A | 2/1991 |
| KR | 20130020062 A | 2/2013 |
| KR | 20130072556 A | 7/2013 |

OTHER PUBLICATIONS

First Office Action from China patent office in a counterpart Chinese patent Application 201811338412.0, dated Sep. 22, 2020( 21 pages ).
Second Office Action from China patent office in a counterpart Chinese patent Application 201811338412.0, dated Apr. 2, 2021( 19 pages ).
European Search Repor, Application No. 18939342.4, dated Nov. 9, 2021 (7 pages).
Notice of Allowance received in Korean Application No. 10-2021-7013511; dated Jun. 9, 2023.
Third Office Action received in the corresponding European Application 18939342.4, dated Apr. 3, 2023.
First Office Action received in the corresponding Korean Application 10-2021-7013511, dated Sep. 30, 2022.

* cited by examiner

CONTACT-TYPE DETECTION ELECTRODE AND MOVABLE ELECTRIC DEVICE

CROSS-REFERENCES TO RELATED APPLICATIONS

The present disclosure is a national phase application of International Application No. PCT/CN2018/122652, filed on Dec. 21, 2018, which claims priority of Chinese Patent Application No. 201811337412.0, filed on Nov. 9, 2018, the entireties of which are herein incorporated by reference.

FIELD

The present disclosure relates to the field of dirt detection technologies, and in particular to a contact-type detection electrode and a movable electric device.

BACKGROUND

With the development of robot technologies, many sweeping robots with various functions are introduced, which provide convenience to people's lives.

However, current sweeping robots do not have dirt detection functions, such as detecting soup, pet feces and other objects with viscosity and diffusivity on the ground. When the sweeping robots of this type clean the ground, the sweeping robots will be thus adhered to the dirt and spread the dirt to the entire room, causing serious pollution to the room.

SUMMARY

The main purpose of the present disclosure is to provide a contact-type detection electrode for detecting dispersible dirt.

In order to achieve the above purpose, the present disclosure provides a contact-type detection electrode including:

A support; and

Electrical conductors, arranged on the support and being flexible.

In some embodiments, electrical conductors is made of conductive plastic, metal, metal conductive particle mixture, graphene, polymer material, or a silica gel conductive strip.

In some embodiments, the support is arranged with a positive-electrode connection portion and a negative-electrode connection portion, a part of electrical conductors are connected to the positive-electrode connection portion, and the rest part of electrical conductors are connected to the negative-electrode connection portion.

In some embodiments, each of electrical conductors has a fine hair-like structure substantially.

In some embodiments, the support has a first side, and the electrical conductors are spaced apart from each other along the first side.

In some embodiments, one of electrical conductors connected to the negative-electrode connection portion is disposed separately between two of electrical conductors connected to the positive-electrode connection portion.

In some embodiments, each of electrical conductors comprises a protruding section protruding from the first side, and a distance between adjacent two of electrical conductors is greater than a sum of lengths of the protruding sections of the adjacent two of electrical conductors.

In some embodiments, each of electrical conductors is arranged in the support, and an end of the each of electrical conductors is exposed from an end surface of the first side.

In some embodiments, the positive-electrode connection portion and the negative-electrode connection portion are plug-in connectors.

In some embodiments, the support is flexible.

In some embodiments, the support is a flexible printed circuit board or a flexible insulator.

In some embodiments, the support has a first surface, and electrical conductors are metal sheets laid on the first surface.

In some embodiments, the contact-type detection electrode further includes a detect-and-control circuit connected to the electrical conductors;

The detect-and-control circuit is configured to provide positive electrical signals to a part of electrical conductors and to provide negative electrical signals to the rest part of electrical conductors;

The detect-and-control circuit is further configured to determine whether dirt is detected based on amount of change in an electrical signal between one of electrical conductors with a positive electrical signal and another one of electrical conductors with a negative electrical signal.

In some embodiments, the amount of change in the electrical signal is the amount of change in resistance, capacitance, or impedance.

In some embodiments, the positive-electrode connection portion and the negative-electrode connection portion are magnetic contacts.

In some embodiments, the support is in a strip shape or an arc shape substantially.

In order to achieve the above purpose, the present disclosure provides a movable electronic device as described above.

In some embodiments, the movable electronic device is a sweeping robot.

BRIEF DESCRIPTION OF THE DRAWINGS

In order to more clearly explain the embodiments of the present disclosure, the following will briefly introduce the drawings required in the description of the embodiments. The drawings in the following description are only some embodiments of the present disclosure.

Figure 1:
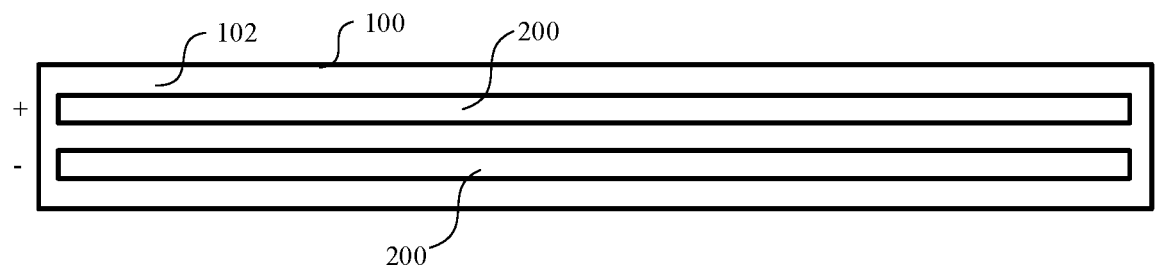
FIG. 1 is a structural schematic view of a contact-type detection electrode according to an embodiment of the present disclosure.

Embodiments of the present disclosure will be further described in conjunction with the embodiments and with reference to the drawings.

DETAILED DESCRIPTION OF THE DISCLOSURE

The embodiments of the present disclosure will be described clearly and completely with reference to the drawings in the embodiments of the present disclosure. The described embodiments are only a part of the embodiments of the present disclosure, but not all the embodiments.

It should be noted that all directional indicators (such as up, down, left, right, front, back, etc.) in the embodiments of the present disclosure are only to explain the relative positional relationship, movement conditions, etc. between components in a posture (as shown in the drawings). If the posture changes, the directional indicators change accordingly.

In addition, the descriptions related to "first", "second", etc. in present disclosure are for descriptive purposes only, and cannot be construed as indicating or implying their relative importance or implicitly indicating the number of embodiments indicated. Thus, the features defined with "first" and "second" may include at least one of the features either explicitly or implicitly. When the combination of embodiments contradicts or cannot be realized, it should be considered that the combination of such solutions does not exist, nor fall within the scope of the present disclosure.

People may encounter such troubles in their daily lives: when there is some viscous and dispersible dirt (oil, soup, porridge, animal feces) on the floor of the room that has not been cleaned in time, and a child in the house is playing an electric toy or a sweeping robot is sweeping the ground, the dirt may be then spread throughout the room, causing large-scale pollution and breeding a lot of bacteria. Especially for a family with a pet at home, when there is no one in the house and the sweeping robot is working, the pet feces may be then spread throughout the room. In this way, the difficulty and cost of cleaning is increased, and generated odors and bacteria will seriously affect the lives of family members. As such, a conflict may also exist between pet feeding and the use of a mobile electric device such as a sweeping robot.

In view of the above problems, some embodiments of the present disclosure provides a contact-type detection electrode, applicable to a mobile electric device such as a sweeping robot, an electric toy, etc. The contact-type detection electrode is configured to detect dirt accurately through a detection method of contacting with dirt, reminding a user or controlling the movable electric device to stop working. In this way, occurrence of situations such as spread of dirt and expanding of polluted area may be reduced. Of course, it should be noted that the contact-type detection electrode according to some embodiments of the present disclosure may also be applied to any other device or place for dirt detection, or the contact-type detection electrode may be made as a separate movable detection device which may continuously move in the room to detect dirt. The implementation structure of the contact-type detection electrode will be mainly described below.

Referring to FIGS. 1 to 4, in some embodiments of the present disclosure, the contact-type detection electrode proposed in some embodiments of the present disclosure includes a support 100 and electrical conductors 200. The electrical conductors 200 are disposed on the support 100. The support 100 may be made of an insulating material to reduce the possibility of short circuit among the electrical conductors 200. Of course, a contact part between each electrical conductor 200 and the support 100 may be insulated. The structure of one electrical conductor 200 may be a substantially sheet which is laid on the support 100. Or, the electrical conductor 200 may substantially have a rod-shaped structure or a fine hair-like structure, and a length of the electrical conductor 200 is protruded from the support 100 or a part of the electrical conductor 200 is exposed from the support 100 to contact with dirt. Of course, the form of the electrical conductor 200 is not limited herein.

In some embodiments, the support 100 may be made of a rigid or flexible material, and the conductive conductors 200 may also be made of a rigid or flexible material, which is not limited herein.

In some embodiments, the number of the electrical conductors 200 may be two, three, or even more. Some of the electrical conductors 200 are configured to be connected to positive electricity, and some of the electrical conductors 200 are configured to be connected to negative electricity. The principle of the dirt detection of the contact-type detection electrode is: a detection circuit detects the amount of change in an electrical signal between an electrical conductor 200 connected to positive electricity and an electrical conductor 200 connected to negative electricity to determine whether dirt is detected. When the two electrical conductors 200 contact with the dirt, a path will be formed through the dirt. The electrical signal between the electrical conductor 200 connected to positive electricity and the electrical conductor 200 connected to negative electricity will change compared with the electrical signal between the two conductors being unconnected. Therefore, whether dirt is detected may be determined based on the amount of change in the electrical signal. When it is determined that the dirt is detected, the user may be reminded to process or control the movable electric device to stop working in time, and the dirt may be prevented from being spread to other places when adhered to the movable electric device, solving the problem of expanding the polluted area. Further, the breeding of bacteria may be reduced, and the difficulty and cost of cleaning may be reduced, which brings convenience to people's lives. As such, conflicts between pet feeding and the use of mobile electric devices such as sweeping robots may be eliminated.

Further, in order to improve the dirt detection ability and limit the abrasion of the electrical conductors 200, the electrical conductors 200 are adopted with a flexible material. It can be understood that when the contact-type detection electrode is arranged on the movable electric device, if the electrical conductors 200 are made of a non-flexible material, it is necessary to maintain a distance between the electrical conductors 200 and the ground or a platform. In this way, when the movable electric device moves, the electrical conductors 200 do not produce resistance against the ground or the platform, reducing the abrasion of the electrical conductors 200 due to contact with the ground or the platform. However, in this case, liquid dirt or extremely small-sized particulate dirt may be difficult to be detected by the non-flexible electrical conductors 200. Whereas the flexible electrical conductors 200 can directly contact the ground or the platform for detection. In this way, the liquid dirt and extremely small-sized particulate dirt on the ground or the platform may also be contacted by the electrical conductors 200 for detection. Moreover, when the flexible electrical conductors 200 are in contact with the ground or the platform, the friction is small, and no additional resistance is generated, therefore the electrical conductors 200 are not easily worn.

The electrical conductors 200 may be made of conductive plastic, metal, metal conductive particle mixture, graphene, polymer material or silica gel conductive strip. The electrical conductors 200 made of these materials have both good conductivity and good flexibility. The metal may be copper, aluminum, etc., which has flexibility. In this case, the support 100 may be adopted with a flexible material structure, and the electrical conductors 200 may be laid on the support 100. The friction force of the electrical conductor 200 in contact with the ground may be thus reduced in virtue of the flexibility of the support 100. In one embodiment, referring to FIG. 1, the support 100 has a first surface 102, and electrical conductors 200 are metal sheets laid on the first surface 102. The number of the metal sheets may be two. The metal sheets may be arranged close to each other and spaced apart to facilitate adhesion of dirt. The conductive plastic may be a material doped with conductive polyacetylene, or a functional polymer material that is processed by processing and molding methods of plastic, after mixing resin as a substrate with a conductive additive or conductive fiber. The substrate may include: polycarbonate/acrylonitrile butadiene styrene (PC/ABS), PC, ABS, polyamide (PA), polypropylene (PPE), etc. The conductive fiber may be: nickel-plated carbon fiber, stainless steel fiber, etc.

It should be noted that, when the electrical conductors 200 are made of a material with better flexibility, the material of the support 100 is not limited. When the electrical conductors 200 are made of a material with less flexibility, the support 100 may be selected to be more flexible, ensuring that the electrical conductors 200 may produce less friction and resistance and when performing the detection work close to or in contact with the ground, and the abrasion may be limited. The support 100 may be a flexible printed circuit board or a flexible insulator. The printed circuit board is simply referred to as a PCB. Polyimide may be applied as a base material of a flexible PCB, which has good flexibility and strong toughness. The thickness of the flexible PCB may be 70 μm, which is 1/100 of the thickness of a rigid PCB board, reducing the volume and consumables.

The electrical conductors 200 may be prepared by a dip coating method, a bar coating method, a spray coating method, an inkjet printing method, a spin coating method, a screen printing method, a gravure printing method, a blade coating method, an electro-spinning method, an electric deposition method, a vacuum suction filtration method, a drop casting method, an interface deposition method, an Langmuir Blodgett (LB) deposition method or a layer-by-layer self-assembly method. The manufacturing processes are simple and easy to implement.

Further, in order to facilitate the electrical conductors 200 to be connected to the positive electricity and the negative electricity, the support 100 may be arranged with a positive-electrode connection portion and a negative-electrode connection portion. Some of the electrical conductors 200 are connected to the positive-electrode connection portion, and others are connected to the negative-electrode connection portion. The positive-electrode connection portion and the negative-electrode connection portion may be terminals, contacts, or jacks, etc. The structure thereof is not limited, and only required to be conveniently connected to a circuit providing positive and negative electricity. The purpose of the embodiments is to avoid each electrical conductor 200 being separately connected to the circuit providing positive and negative electricity. It is convenient to connect the electrical conductors 200 by leading out two terminals via the positive-electrode connection portion and the negative-electrode connection portion.

In some embodiments, the positive-electrode connection portion and the negative-electrode connection portion are configured as plug-in connectors. In this way, the connection structure between the electrical conductors 200 and the circuit providing positive and negative electricity may be simplified, and it is convenient to install and replace electrodes.

In some embodiments, the positive-electrode connection portion and the negative-electrode connection portion are configured as magnetic contacts. The corresponding connection to the circuit providing positive and negative electricity is then achieved by means of magnetic adsorption. In one embodiment, it is also convenient to install and replace electrodes. Compared with the plug-in connectors and other connection structures, the volume of the magnetic contacts may be less.

Figure 2:
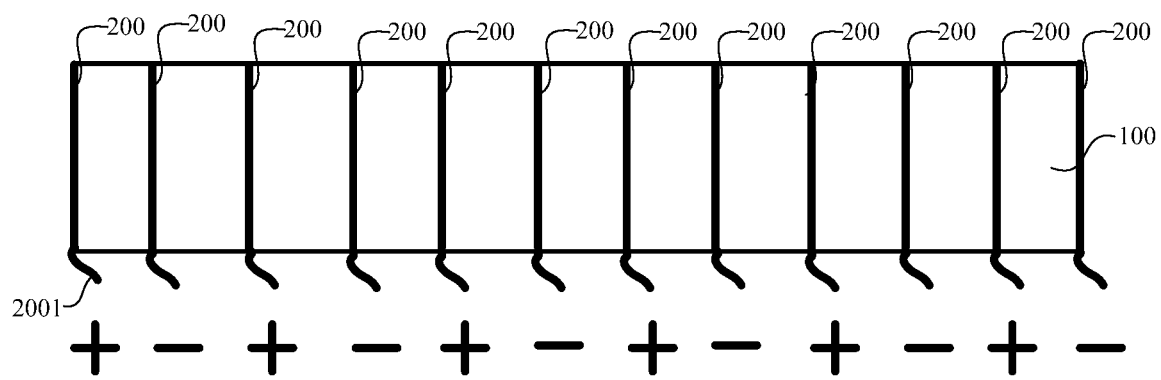
FIG. 2 is a structural schematic view of a contact-type detection electrode according to another embodiment of the present disclosure.
Figure 5:
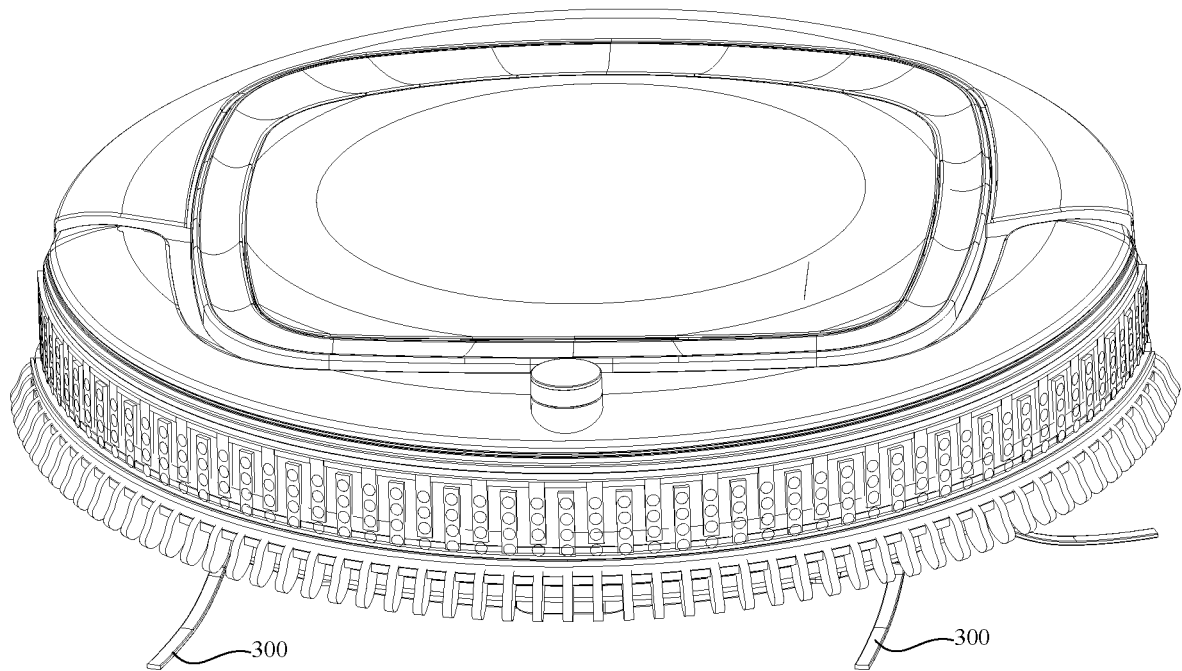
FIG. 5 is a structural schematic view of a movable electric device according to an embodiment of the present disclosure.
Figure 6:
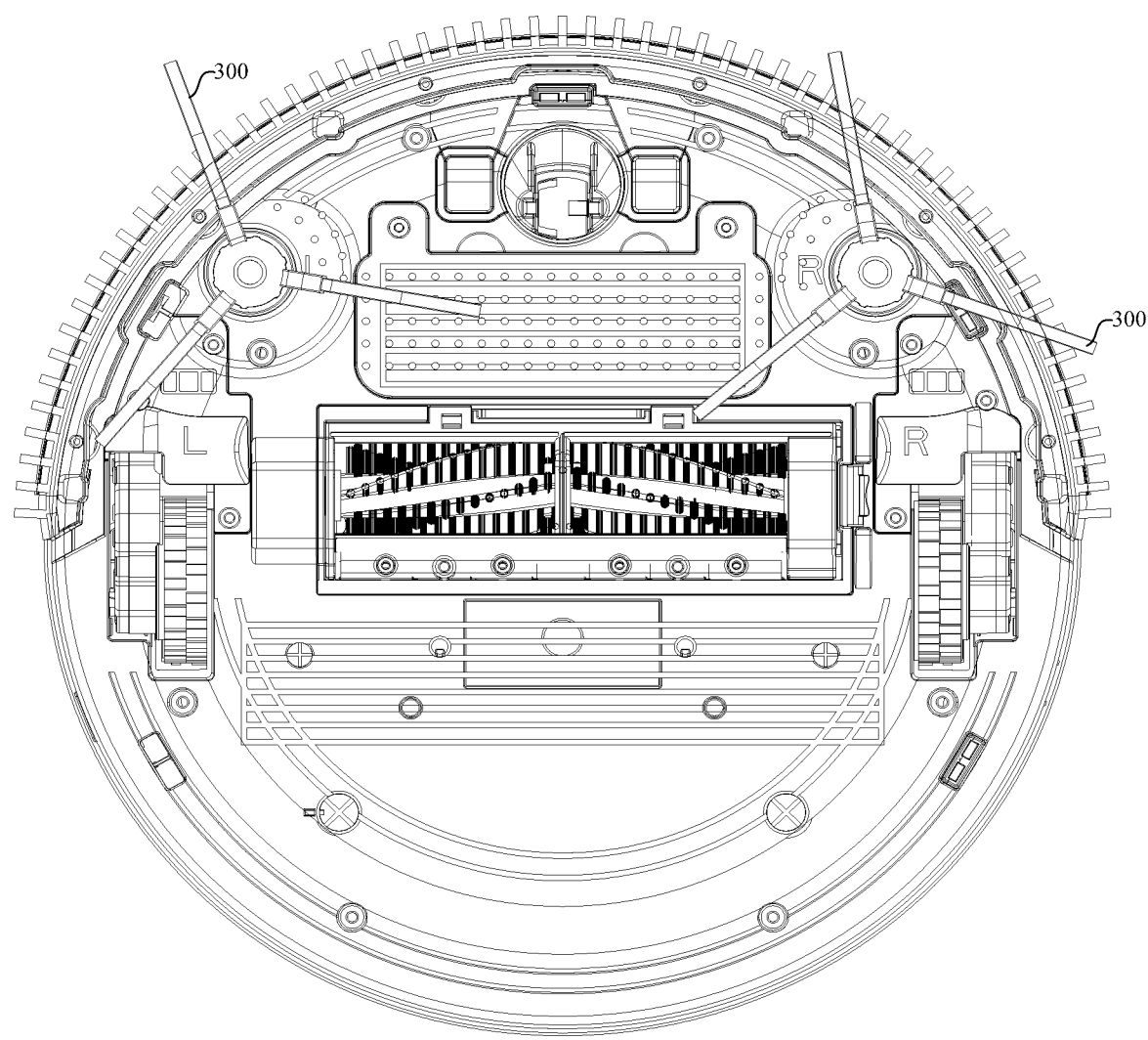
FIG. 6 is another perspective view of the movable electric device shown in FIG. 5.

Referring to FIGS. 2, 5 and 6, in some embodiments, the electrical conductors 200 have a substantially fine hair-like structure. The support 100 has a first side, and the electrical conductors 200 are spaced apart from each other along the first side 101.

In the embodiments, the fine hair-like structure of the electrical conductors 200 and the support 100 constitute a structure similar to a brush, which may be configured as a sweeping assembly 300 on the sweeping robot, or may be installed at a location to increase the effect of cleaning dust while achieving the detection of dirt.

In the embodiments, in order to improve the detection range, the arrangement of the electrical conductors 200 may be implemented in a positive and negative electrical staggered arrangement. In one embodiment, an electrical conductor 200 connected to the negative-electrode connection portion is disposed separately between two electrical conductors 200 connected to the positive-electrode connection portion. In the arrangement of the electrical conductors 200, as long as any two adjacent electrical conductors 200 contact with dirt and form a path through the dirt, a detection signal will be output to determine that the dirt is detected.

Figure 3:
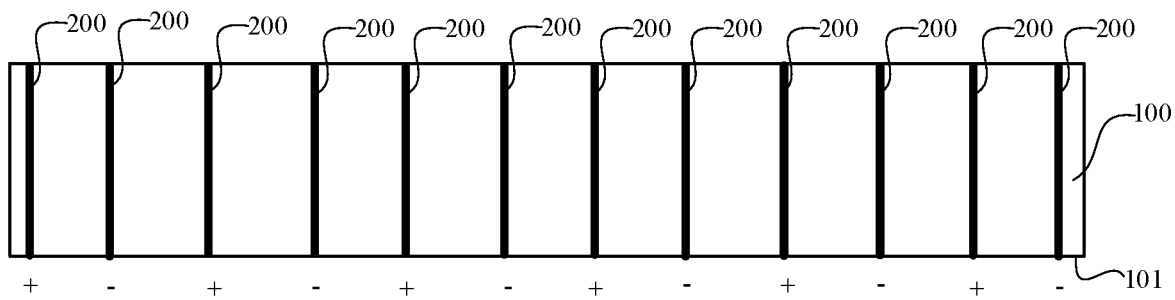
FIG. 3 is a structural schematic view of a contact-type detection electrode according to further another embodiment of the present disclosure.
Figure 4:
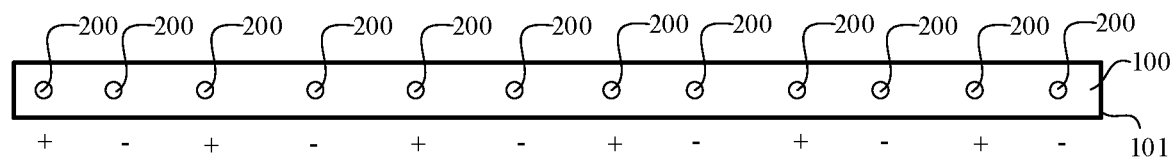
FIG. 4 is another perspective view of the contact-type detection electrode shown in FIG. 3.

In the embodiments, referring to FIG. 3 and FIG. 4, the electrical conductors 200 may be disposed in the support 100, and an end of each electrical conductor 200 is exposed from an end surface of the first side 101. When the exposed end is in contact with dirt, a path is formed to achieve the detection of dirt. Or, an end of each electrical conductor 200 protrudes from the first side 101. That is, each electrical conductor 200 includes a protruding section 2001 protruding from the first side 101. When the protruding section 2001 is in contact with dirt, a path is formed to achieve the detection of dirt.

When an end of each electrical conductor 200 protrudes from the first side 101, in order to avoid short-circuiting between the electrical conductors 200 corresponding to positive and negative electricity, which leads to a short circuit outputting an erroneous detection signal, the distance between two adjacent electrical conductors 200 is greater than the sum of lengths of the protruding sections 2001 of the two electrical conductors 200.

In the embodiments, bristles may also be arranged on the support 100 to clean dust. In particular, the bristles may be arranged between the two adjacent electrical conductors 200 to adhere dirt, and the adjacent two electrical conductors 200 may easily form a path when contacting with dirt. The support 100 may be arranged in a strip shape or an arc shape substantially for sweeping dust.

Further, the contact-type detection electrode may be made as an independent component to be further applied to various devices or places. In further embodiments, the contact-type detection electrode further includes a detect-and-control circuit connected to the electrical conductors 200.

The detect-and-control circuit is configured to provide positive electrical signals to a part of the electrical conductors 200 and provide negative electrical signals to another part of the electrical conductors 200.

The detect-and-control circuit is also configured to determine whether dirt is detected based on the amount of change in electrical signal between any electrical conductor 200 with a positive electrical signal and any electrical conductor 200 with a negative electrical signal.

When the positively charged electrical conductor 200 and the negatively charged electrical conductor 200 are in contact with dirt, an electrical path is formed through the dirt. The electrical signal between the positively charged electrical conductor 200 and the negatively charged electrical conductor 200 will change compared with the electrical signal between the two conductors being unconnected. An appropriate comparison threshold may be configured to determine whether the dirt is detected based on the amount of change in the electrical signal. When it is determined that dirt is detected, the user may be reminded to process or control the movable electric device to stop working in time, and the dirt may be prevented from being spread to other places when adhered to the movable electric device, solving the problem of expanding the polluted area.

In one embodiment, the amount of change in the electrical signal may be the amount of change in resistance, capacitance or impedance, etc. Correspondingly, the detect-and-control circuit may correspond to a resistance detection circuit, a capacitance detection circuit, and an impedance detection circuit. The resistance may also be implemented in the form of conductivity, Of course, there are other implementation methods, which are not listed here in detail.

In the above embodiments, it should be noted that in the contact-type detection electrode of the present disclosure, detecting dirt is based on direct contact with dirt, which has high accuracy and strong practicability, and can be truly applied to the market.

In addition, referring to FIGS. 1 to 6, some embodiments of the present disclosure also provide a movable electric device, which may be a sweeping robot or an electric toy. The movable electric device includes the above-mentioned contact-type detection electrode, which will not be repeated here.

The contact-type detection electrode may be arranged at a position with a high probability of contact with dirt, including a forward direction and a tail direction (when moving backwards) of a chassis of the movable electric device, not limited to positions such as a periphery of the chassis, the chassis, a periphery of wheels, a wheel fender, etc.

It should be noted that in the embodiments, a corresponding circuit may be additionally arranged to provide the positive and negative electrical signals to the electrical conductors 200 and provide a discrimination mechanism to detect dirt. Of course, the above embodiments with the detect-and-control circuit may also be applied directly.

What is claimed is:

1. A contact-type detection electrode for detecting dispersible dirt, comprising:
   a support; and
   a plurality of electrical conductors, arranged on the support and being flexible, and each of the plurality of electrical conductors having a fine hair-like structure;
   wherein
   the support is arranged with a positive-electrode connection portion and a negative-electrode connection portion, a part of the plurality of electrical conductors are connected to the positive-electrode connection portion, and a remaining part of the plurality of electrical conductors are connected to the negative-electrode connection portion;
   the support has a first side, and the plurality of the electrical conductors are spaced apart from each other along the first side;
   one of the plurality of electrical conductors connected to the negative-electrode connection portion is disposed separately between two of the plurality of electrical conductors connected to the positive-electrode connection portion; and
   each of the plurality of electrical conductors comprises a protruding section protruding from the first side, and a distance between adjacent two of the plurality of electrical conductors is greater than a sum of lengths of the protruding sections of the adjacent two of the plurality of electrical conductors.

2. The contact-type detection electrode according to claim 1, wherein the plurality of electrical conductors is made of conductive plastic, metal, metal conductive particle mixture, graphene, polymer material, or a silica gel conductive strip.

3. The contact-type detection electrode according to claim 1, wherein each of the plurality of electrical conductors is arranged in the support, and an end of the each of the plurality of electrical conductors is exposed from an end surface of a first side.

4. The contact-type detection electrode according to claim 1, wherein the positive-electrode connection portion and the negative-electrode connection portion are plug-in connectors.

5. The contact-type detection electrode according to claim 1, wherein the support is flexible.

6. The contact-type detection electrode according to claim 5, wherein the support is a flexible printed circuit board or a flexible insulator.

7. The contact-type detection electrode according to claim 5, wherein the support has a first surface, and the plurality of electrical conductors are a plurality of metal sheets laid on the first surface.

8. The contact-type detection electrode according to of claim 1, further comprising a detect-and-control circuit connected to the plurality of the electrical conductors;
   wherein the detect-and-control circuit is configured to provide positive electrical signals to a part of the plurality of electrical conductors and to provide negative electrical signals to a remaining part of the plurality of electrical conductors;
   the detect-and-control circuit is further configured to determine whether dirt is detected based on amount of change in an electrical signal between one of the plurality of electrical conductors with a positive electrical signal and another one of the plurality of electrical conductors with a negative electrical signal.

9. The contact-type detection electrode according to of claim 8, wherein the amount of change in the electrical signal is the amount of change in resistance, capacitance, or impedance.

10. The contact-type detection electrode according to of claim 1, wherein the positive-electrode connection portion and the negative-electrode connection portion are magnetic contacts.

11. The contact-type detection electrode according to claim 1, wherein the support is in a strip shape or an arc shape.

12. A movable electronic device, comprising:
   a contact-type detection electrode for detecting dispersible dirt, wherein the contact-type detection electrode comprises:
   a support; and a plurality of electrical conductors, arranged on the support and being flexible, and each of the plurality of electrical conductors having a fine hair-like structure; wherein the support is arranged with a positive-electrode connection portion and a negative-electrode connection portion, a part of the plurality of electrical conductors are connected to the positive-electrode connection portion, and a remaining part of the plurality of electrical conductors are connected to the negative-electrode connection portion;

the support has a first side, and the plurality of the electrical conductors are spaced apart from each other along the first side;

one of the plurality of electrical conductors connected to the negative-electrode connection portion is disposed separately between two of the plurality of electrical conductors connected to the positive-electrode connection portion; and each of the plurality of electrical conductors comprises a protruding section protruding from the first side, and a distance between adjacent two of the plurality of electrical conductors is greater than a sum of lengths of the protruding sections of the adjacent two of the plurality of electrical conductors.

13. The movable electronic device according to claim 12, being a sweeping robot.

14. The movable electronic device according to claim 12, wherein the plurality of electrical conductors is made of conductive plastic, metal, metal conductive particle mixture, graphene, polymer material, or a silica gel conductive strip.

15. The movable electronic device according to claim 12, wherein the support is arranged with a positive-electrode connection portion and a negative-electrode connection portion, a part of the plurality of electrical conductors are connected to the positive-electrode connection portion, and a remaining part of the plurality of electrical conductors are connected to the negative-electrode connection portion.

* * * * *